(12) United States Patent
Eswaran et al.

(10) Patent No.: US 7,808,898 B2
(45) Date of Patent: Oct. 5, 2010

(54) FLOW ESTIMATOR

(75) Inventors: Anand Eswaran, Karnataka (IN); Ravindra Guntur, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 96 days.

(21) Appl. No.: 12/168,898

(22) Filed: Jul. 8, 2008

(65) Prior Publication Data

US 2009/0046581 A1    Feb. 19, 2009

(30) Foreign Application Priority Data

Aug. 14, 2007 (IN) ..................... 1808/CHE/2007

(51) Int. Cl.
*H04L 1/00* (2006.01)
*H04L 12/26* (2006.01)
(52) U.S. Cl. ................. 370/230; 370/229; 370/230.1
(58) Field of Classification Search .......... 370/229–235
See application file for complete search history.

(56) References Cited

U.S. PATENT DOCUMENTS

| | | | |
|---|---|---|---|
| 6,853,619 B1 * | 2/2005 | Grenot | 370/232 |
| 7,366,165 B2 * | 4/2008 | Kawarai et al. | 370/366 |
| 7,369,554 B1 * | 5/2008 | Modelski et al. | 370/392 |
| 7,397,766 B2 * | 7/2008 | Kodialam et al. | 370/252 |
| 2003/0214948 A1 * | 11/2003 | Jin et al. | 370/392 |
| 2007/0211647 A1 * | 9/2007 | Hao et al. | 370/254 |
| 2007/0237079 A1 * | 10/2007 | Whitehead | 370/235 |
| 2007/0280245 A1 * | 12/2007 | Rosberg | 370/392 |
| 2008/0219181 A1 * | 9/2008 | Kodialam et al. | 370/252 |
| 2008/0279111 A1 * | 11/2008 | Atkins et al. | 370/252 |

* cited by examiner

*Primary Examiner*—Chi H Pham
*Assistant Examiner*—Robert Lopata

(57) ABSTRACT

A system for communication flow estimation and method therefore are described. The system comprises a filter array arranged to receive a packet, an index hash unit, a flow count array, and a global average counter. The index hash unit generates an index based on a received index set. The flow count array comprises one or more counters and updates a counter based on a received index. The global average counter updates an average count of received packets based on the received packet.

19 Claims, 3 Drawing Sheets

FLOW ESTIMATOR

BACKGROUND

The long-term average statistics of flows in a network allows network administrators to plan future network upgrades. Such information can also lead to the identification of vagaries such as denial of service (DoS) attacks, switching loops, etc. in the network. The break-up of traffic based on the type of traffic is interesting to facilitate optimizations (such as strategic web-server caching) in the network. This makes the estimation of average flow throughput in a network useful.

Because a packet passes through multiple forwarding routers before reaching the destination, there is a need to prevent heavy-hitter flows (also referred to as "elephant flows") from hogging forwarding path bandwidth and thus starving other flows that pass through the path. Heavy hitter flows refers to a flow whose bandwidth, either instantaneous or average, is significantly larger in proportion to other flows in a system. Congestion avoidance in the Internet is implemented in the form of TCP congestion control protocols, e.g., Reno/Tahoe/SACK at the end hosts. Assuming that the forwarding routers allocate buffers fairly among flows that pass through them, the steady state transmission control protocol (TCP) window size at the sender is equal to the fair buffer share at the bottleneck router. Typically routers augment the congestion collapse by using preferentially dropping schemes, e.g., random early detection (RED) and Blue, in order to pro-actively enforce fairness among flows that pass through them.

RED is a probabilistic mechanism that randomly marks packets based on queue size estimates. RED provides router-based queue management for TCP flows and because RED uses queue occupancy as the sole metric of congestion, there is always a finite probability that the wrong packet may be penalized, i.e., dropped.

BLUE is a class of queue management algorithms which use scalable fast binning techniques to probabilistically mark packets based on link-utilization and error-rates. Stochastic Fair BLUE uses an approximate scheme for binning packets in queues and then probabilistically drops packets based on queue sizes.

Prior approaches may problematically penalize a packet, i.e., drop the packet, for the flooding caused by another rogue flow.

DESCRIPTION OF THE DRAWINGS

One or more embodiments is illustrated by way of example, and not by limitation, in the figures of the accompanying drawings, wherein elements having the same reference numeral designations represent like elements throughout and wherein.

DETAILED DESCRIPTION

Figure 1:
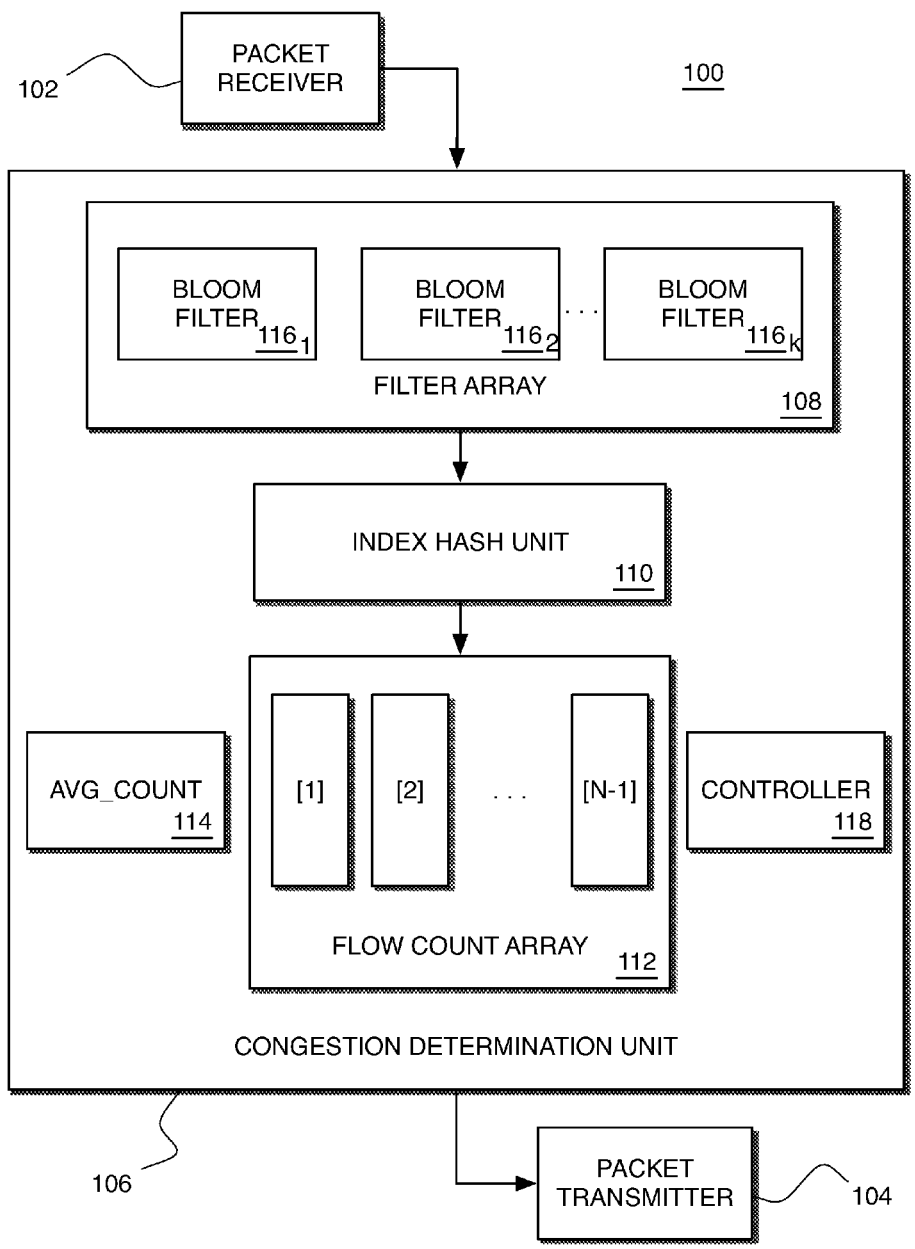
FIG. 1 is a high-level functional block diagram of a portion of a network communication device according to an embodiment.

FIG. 1 depicts a high-level functional block diagram of at least a portion of a network communication (NC) device 100, e.g., a switch, or other communication management device, etc., according to an embodiment comprising a packet reception capability, i.e., packet receiver 102, and a packet transmission capability, i.e., packet transmitter 104. In at least some embodiments, device 100 comprises more than one packet receiver 102 and more than one packet transmitter 104, however, for simplicity a single instance of each is described herein. In at least some other embodiments, packet receiver 102 and packet transmitter 104 may comprise a packet transceiver having the capability to transmit and receive packets. Packet receiver 102 receives communication packets from a network connection, e.g., a network port, to which device 100 is connected and packet transmitter 104 transmits communication packets to a network connection to which the device is connected.

NC device 100 also comprises a congestion determination unit (CDU) 106 communicatively coupling packet receiver 102 and packet transmitter 104. CDU 106 analyzes received communication packets and determines whether to: allow the transmission of the packet, by packet transmitter 104, toward the destination indicated in the packet or drop the packet and thereby prevent further transmission of the packet by NC device 100. In at least some embodiments, CDU 106 may comprise one or more independent devices or a single device. In at least some embodiments, CDU 106 may comprise hardware, software, and/or a combination thereof.

CDU 106 comprises a filter array 108 communicatively coupled to an index hash unit 110 which, in turn, is communicatively coupled to a flow count array 112. CDU 106 also comprises an average counter 114, i.e., "AVG_COUNT," storage location for maintaining a count of the average number of communication packets over a period of time received by NC device 100.

Filter array 108 comprises a set of Bloom filters $116_1$-$116_k$ (collectively referred to as Bloom filters 116) arranged to receive the communication packet from packet receiver 102. NC device 100 applies Bloom filters 116 to the received communication packet in order to classify the received packet. The output of the filter array 108, i.e., Bloom filters 116, is provided to index hash unit 110.

Bloom Filter Operation

Given a set where each member is a particular pattern of interest, a Bloom filter is a fast simple mechanism for approximately checking if arbitrary input strings (packets) contain any of those patterns. In at least some embodiments, a Bloom filter is a space-efficient randomized data structure for representing a set to support queries regarding the membership of a particular packet provided to the filter, e.g., a particular destination address, source address, content type, a combination thereof, etc. of a received packet. Filter array 108 may be arranged to filter for one or more portions, e.g., bits, bytes, etc., of a packet. In at least some embodiments, filter array 108 may be arranged based on user-received input and/or specification. In at least some embodiments, individual Bloom filters 116 may be arranged to particular communication packet flows.

In at least some embodiments, Bloom filter 116 is implemented as follows:

1) Each packet is fed as input into k hash functions;
2) Each of the hash functions returns as output a number in range [0 . . . m−1];
3) The output of the hash function serves as an index into a bit array containing m entries;
4) The bit indexed by the hash function output is either set to 1 or checked for a 1 depending on whether the operation consists of inserting a new pattern or checking for an existing pattern; and
5) A packet is said to match a pattern only if all k bits indexed by the k hash functions are all set.

Bloom filters are probabilistic in nature and, in particular, not every packet that is claimed to match a particular pattern actually matches the pattern. The false positive rate of a Bloom filter is a function of the width of the Bloom filter, the number of hash functions, etc. However, a Bloom filter never accepts packets that do not match the pattern, the false negative rate of a Bloom filter is zero.

Index hash unit 110 receives the output from filter array 108, i.e., a set of indices indicative of one or more Bloom filters matching the received packet, performs a hash function on the index set, and provides the index as output.

In addition to the Bloom filter, one or more embodiments further comprise index hash unit 110 with the number of entries equal to the number of target flows supported by the router. The k indices returned by the Bloom filter are used to represent the flow. Given k locations returned by the Bloom filter, the index hash unit applies a hash function of the type:

$$idx = h(i1, i2, \ldots ik)$$

which receives as input the k indices and returns an index idx in an array that has counters corresponding to each flow of concern.

In at least some embodiments, index hash unit 110 may be implemented using bits of a k-index tuple to gate relevant array entries in an array filled with random values in a particular range, e.g., one through N−1. A parallel XOR operation of the gated elements results in a random value with the particular range. Depending on the k-index tuple, a random value in the particular range is returned which may be used as the index for flow count array 112.

Flow count array 112 stores a count of a number of packets received corresponding to one of a predetermined number of communication flows. Each flow corresponds to a particular index received from index hash unit 110. In at least some embodiments, each flow corresponds to a particular communication packet flow such as packets having a particular source address, a particular destination address, a particular content type, a combination thereof, etc. Flow count array 112, as depicted, comprises one to N−1 flow counts. For each packet received from packet receiver 102, CDU 106 increments a counter in flow count array 112 corresponding to the packet based on the applied filter array 108 and index hash unit 110. In at least some embodiments, a particular counter of flow count array 112 may be referred to as providing an instantaneous count of the particular packet.

Each counter value (which corresponds to each flow) stores 2 values. One of the stored values is an instantaneous value of the packet count, i.e., pkt_count_inst, over a window of the last T cycles. The other value stored is a long-term average, i.e., pkt_count_avg, that comprises a function of the type:

$$pkt\_count\_avg = f1 * pkt\_count\_avg + f2 * pkt\_count\_inst$$

where f1 and f2 are global fractional constants. In at least some embodiments, f1 and f2 are fractions satisfying the relation f1+f2=1. In at least some embodiments, f1 is larger than f2, e.g., f1=0.9 and f2=0.1.

Average counter 114 stores a global count of the average number of communication packets received over a period of time, e.g., a predetermined time period, for the communication flows, i.e., each packet received at CDU 106.

CDU 106 also comprises a controller 118, e.g., a processor, application specific integrated circuit, or other logic device, for determining whether to permit transmission of a packet based on the global count value stored in average counter 114 and a counter of flow count array 112.

Figure 2:
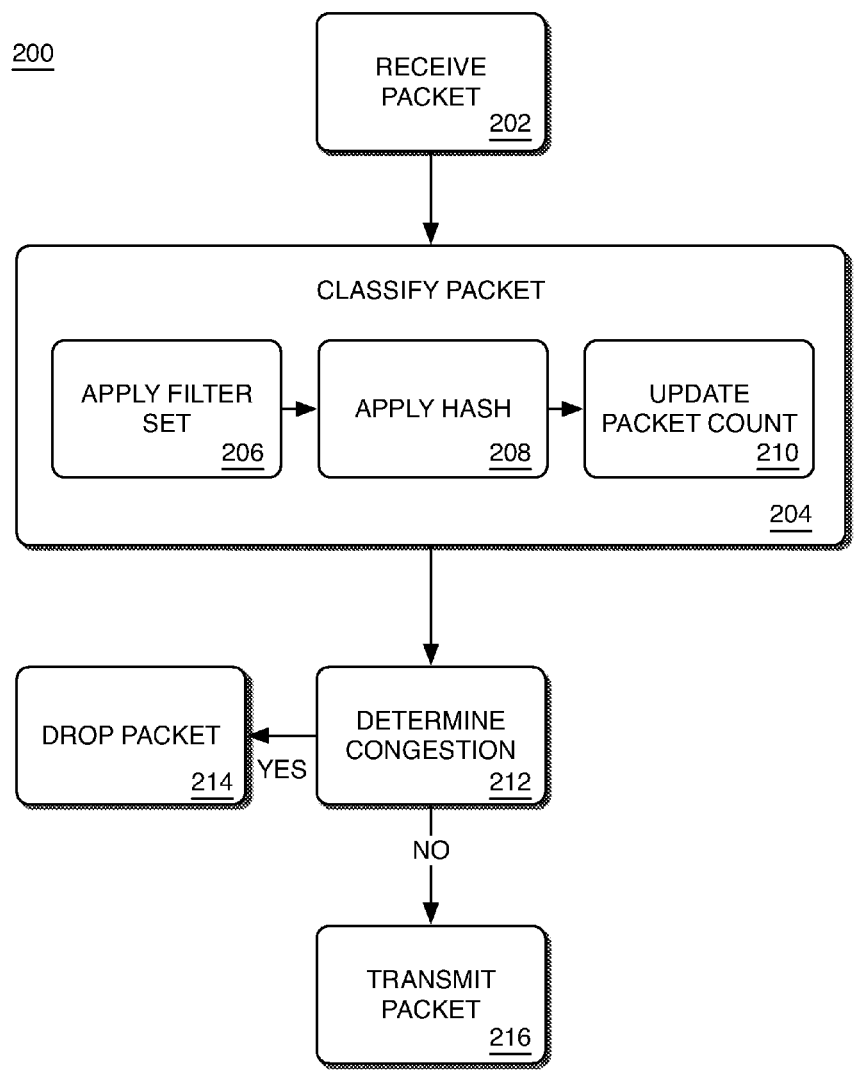
FIG. 2 is a high-level process flow diagram of a flow estimator according to an embodiment.

FIG. 2 depicts a high-level process flow diagram of at least a portion 200 of operation of NC device 100. The flow begins at receive packet functionality 202 wherein NC device 100 receives a packet from a network connection, e.g., received by packet receiver 102. Packet receiver 102 transmits the packet to CDU 106 and the flow proceeds to classify packet functionality 204.

Classify packet functionality 204 comprises an apply filter set functionality 206, an apply hash functionality 208, and an update packet count functionality 210. Execution of a set of instructions comprising apply filter set functionality 206 causes CDU 106 to apply filter array 108 to the received packet. Apply filter set functionality 206 output comprises a set of indices indicating with which Bloom filters 116 the received packet matches. In at least some embodiments, the output of filter array 108 is provided directly as an input to index hash input 110. The process flow proceeds to apply hash functionality 208.

Apply hash functionality 208 causes CDU 106 to supply the set of indices from filter array 108 as input to index hash unit 110 and cause the index hash unit to perform a hash of the index set and generate an index value.

The flow proceeds to update packet count functionality 210 wherein, based on the index value generated by apply hash functionality 208, CDU 106 updates the appropriate counter corresponding to the index value. Update packet count functionality 210 increments the count value and updates the average count value associated with the appropriate counter. In at least some embodiments, update packet count functionality 210 updates the average count value based on application of a function, e.g., a sum of a product of a predetermined fractional constant and the average count value and a product of another predetermined fractional constant and the current count value of the counter.

Classify packet functionality 204 also updates the average counter 114 based on the packet, i.e., increments the value of the average counter. The flow proceeds to determine congestion functionality 212.

Determine congestion functionality 212 determines, based on average counter 114, the sizes of queues of NC device 100 corresponding to the network connections of the device, and one or more of the counters of flow count array 112, whether a particular queue size exceeds a predetermined queue threshold value and whether the packet count for the particular flow divided by average counter 114 exceeds a predetermined load-factor threshold. If both threshold values are exceeded, the process flow proceeds to drop packet functionality 214 ("YES"). If not, the process flow proceeds to transmit packet functionality 216 ("NO"). In at least some embodiments, the queue is an input queue. In at least some alternative embodiments, the queue is an output queue.

In at least some embodiments, controller 118 executes a set of instructions to perform determine congestion functionality 212.

Drop packet functionality 214 determines whether to drop the received packet based on the type of the packet and the particular flow (corresponding to a counter) of the packet. If the flow is a user datagram protocol (UDP) type flow, the packet is dropped based on a rate limiting policy, e.g., 1 of every X packets corresponding to the UDP flow are transmitted. The value of X may be customized on a per-flow basis. In at least some embodiments, the value of X may be stored in the counter of flow counter array 112 corresponding to the particular flow.

If the flow is a transmission control protocol (TCP) type flow, CDU 106 applies a probabilistic packet marking scheme to drop particular packets of the given flow. In at least some embodiments, the drop packet rate is directly proportional to an overload factor f. Overload factor f is the ratio of a flow count to average count. The probabilistic scheme used comprises the ability to generate a random number within a particular range. The greater an overload factor of the given flow, the greater the range of random numbers within which the flow may fall. Two example pseudorandom numbers which may be used comprise a CRC-based number and a shift register-based number.

Using the CRC-based number, a particular packet is dropped if the CRC of the packet is within a particular range determined based on the packet drop probability. When the overload factor f crosses a particular predetermined threshold, one or more packets are to be dropped. Given an average queue occupancy, a number of packets to be dropped per a given number of packets may be determined, i.e., the drop probability.

Using the shift register-based number, a maximum-span feedback shift register which undergoes a state transition per clock cycle is used as a pseudorandom number generator and if the generated number is within a particular range, the packet is dropped.

Transmit packet functionality 216 causes the transmission of the received packet to the destination indicated for the packet, e.g., via packet transmitter 104.

Figure 3:
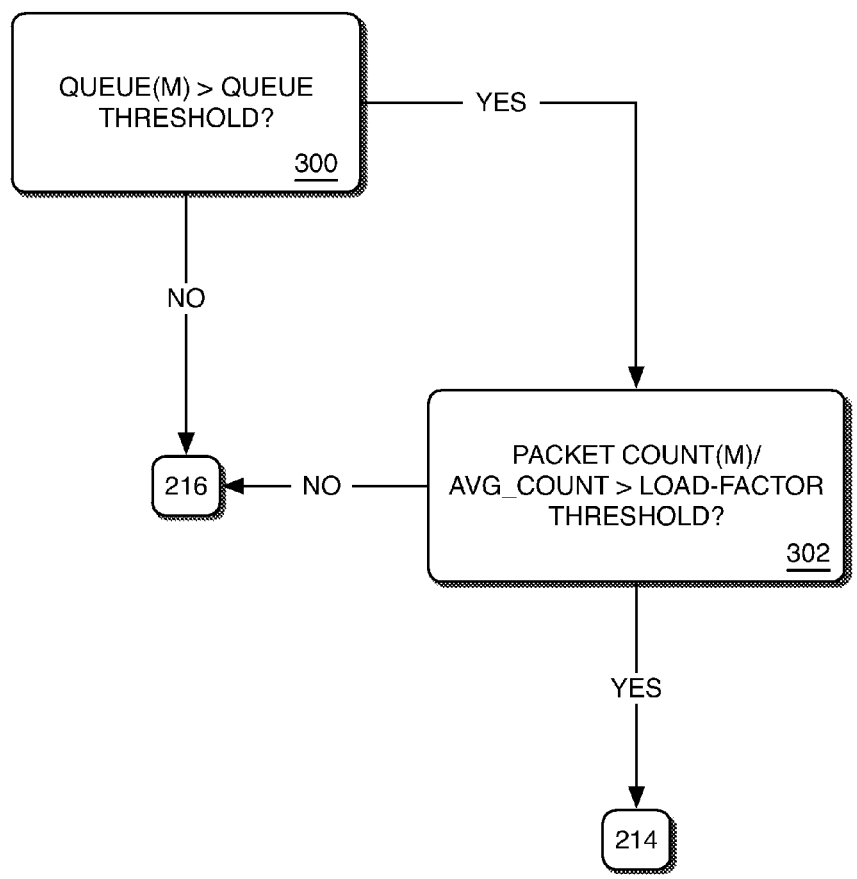
FIG. 3 is a high-level process flow diagram of congestion determination according to an embodiment.

FIG. 3 depicts a high-level process flow diagram of determine congestion functionality 212 according to an embodiment. The process flow begins at queue comparison functionality 300 wherein a periodically computed average queue size is compared to a predetermined queue threshold value. In at least some embodiments, the average queue size represents an average of the packet count for a particular queue of NC device 100. If the result of the determination is positive (i.e., the threshold is exceeded or "YES"), the flow proceeds to load-factor comparison functionality 302. If the result of the determination is negative (i.e., the threshold is not exceeded or "NO"), the flow proceeds to transmit packet functionality 216. In at least some embodiments, the average queue size is a long term average queue size. For example, an average queue size determined based on instantaneous values computed over one hour is considered long term in comparison to an average queue size determined over ten minutes. In at least some embodiments, the long term average queue size may be predetermined.

In at least some embodiments, the average queue size determination comprises application of the function:

$$Q\_avg = k1 * Q\_inst + k2 * Q\_avg$$

wherein k1 and k2 are fractional values representing instantaneous and average queue size contributions and Q_inst and Q_avg are, respectively, the instantaneous and average queue sizes. In at least some embodiments, k1 and k2 are design parameters dependent on the long term average queue size. For example, if k1=0.9 and k2=0.1, then Q_avg is a short-term average because Q_inst is more heavily weighted than Q_avg. In at least some other embodiments, if k1=0.1 and k2=0.9, then Q_avg is a long term average because Q_inst is less heavily weighted than Q_avg.

In at least some embodiments, if the result of queue comparison functionality 300 is positive, an overload flag is set.

Load-factor comparison functionality 302 determines a ratio of the particular flow counter of flow count array 112 to average counter 114 and compares the ratio to the predetermined load-factor threshold. Load-factor comparison functionality 302 determines that the particular flow is a "heavy hitter" if the ratio exceeds the load-factor threshold and the process flow proceeds to drop packet functionality 214 ("YES"). Load-factor comparison functionality 302 determines that the particular flow is not a "heavy hitter" if the ratio does not exceed the load-factor threshold and the process flow proceeds to transmit packet functionality 216 ("NO").

The functionality depicted and described in conjunction with FIGS. 2 and 3 may comprise one or more sets of instructions which, when executed by a processor or other instruction executing and/or interpreting device, causes the device to perform the functionality. In at least some embodiments, the functionality may comprise one or more discrete logic devices.

At least one or more embodiments may be designed with the intent to ensure that the router bandwidth is fairly shared by all flows passing through a network. A counting Bloom filter based implementation allows precise identification of the per-flow packet counts and hence can easily identify heavy-hitter flows and hence rate-limit them. Besides enforcing rate-control for TCP flows, the proposed scheme, in some embodiments, may also rate-limit UDP flows that do not have an end-to-end rate-limiting mechanism.

The definition of a flow (in turn defined by the classification tuple of concern) is software customizable and/or user-configurable. The Bloom filter may be programmed with a bit-mask to gate only certain fields of interest in a packet and shunt other packet fields. However, because congestion management schemes such as RED, Blue, etc., are typically enforced for layer 4 (of the OSI network layer model) flows, in at least some embodiments, a flow is considered a layer 4 entity defined by a standard 5-tuple classifier.

Another embodiment comprises two NC devices 100 installed on a network, i.e., a first NC device and a second NC device. The operation of the two NC devices 100 is modified such that drop packet 214 only drops a packet which has been marked by the other NC device. For example, given that first NC device receives an un-marked packet, the first NC device operates similar to the process of FIG. 2, however, the first NC device marks the received packet if the result of determine congestion functionality 212 is positive ("YES") and transmits the packet toward the destination. Upon receiving the marked packet, the second NC device operates similar to the process of FIG. 2 and determines that the packet is marked. If the second NC device determines that the marked packet is to be marked, the packet is dropped. If the second NC device determines that the marked packet should not be marked, the packet is transmitted toward the destination. In at least some further embodiments, more than two NC devices 100 may be used.

In at least some further embodiments, flows are counted which do not match particular "white-listed" application header signatures in packets, i.e., flows which match real-time application signatures are to be ignored. According to a particular further embodiment, a received packet is first filtered through an access control list and passed to filter array 108 if there is no match with an application signature in the access control list thereby preventing, in at least one embodiment, real-time high-priority traffic from being throttled by the CDU 106. In at least some embodiments, a ternary content addressable memory (TCAM)-based access control list may be used.

What is claimed is:

1. A system for communication flow estimation, comprising:
 a filter array arranged to receive a packet;
 an index hash unit communicatively coupled with said filter array and arranged to generate an index based on a received index set;

a flow count array communicatively coupled to receive the index from said index hash unit, wherein said flow count array comprises one or more counters, and wherein said flow count array is arranged to update a counter based on the received index; and a global average counter arranged to update an average count of received packets based on the received packet.

2. The system as claimed in claim 1, further comprising:

a controller communicatively coupled with said flow count array and said global average counter and arranged to determine whether to permit transmission of the packet based on said global average counter and a counter of said one or more counters.

3. The system as claimed in claim 1, wherein said filter array comprises:

one or more Bloom filters arranged to filter the received packet and generate an indication whether the received packet matches the filter.

4. The system as claimed in claim 1, wherein said filter array is arranged to classify the received packet based on a classification tuple.

5. The system as claimed in claim 1, wherein said filter array is user-configurable.

6. The system as claimed in claim 1, wherein each of said one or more counters comprise:

a packet count; and an average packet count.

7. A method of estimating communication flow by a communication device, comprising:

classifying, by the communication device, a received packet according to a particular flow;

updating a counter corresponding to the particular flow based on the classified packet;

updating a value of an average counter based on the received packet; and estimating the communication flow based upon a packet count ratio by dividing a packet count corresponding to the particular flow by the average counter value.

8. The method as claimed in claim 7, further comprising:

dropping the received packet based on an average queue size exceeding a queue threshold and the packet count ratio exceeding a load-factor threshold.

9. The method as claimed in claim 8, wherein the dropping the received packet comprises a queue size of a queue corresponding to the particular flow.

10. The method as claimed in claim 8, wherein the dropping the received packet comprises:

determining the average queue size by summing the application of a first fractional value to an instantaneous queue size and the application of a second fractional value to the average queue size.

11. The method as claimed in claim 7, further comprising:

transmitting the received packet based on a queue size not exceeding a queue threshold or the packet count ratio not exceeding a load-factor threshold.

12. The method as claimed in claim 7, wherein classifying comprises:

generating a set of indices by filtering the received packet;

generating an index based on hashing the generated set of indices; and classifying the received packet according to the generated index.

13. The method as claimed in claim 12, wherein the filtering comprises:

applying one or more Bloom filters to the received packet.

14. The method as claimed in claim 13, wherein the applying one or more Bloom filters generates the set of indices based on one or more match indications resulting from the one or more Bloom filters.

15. The method as claimed in claim 7, wherein the updating comprises incrementing a packet count of the counter and updating an average packet count of the counter.

16. The method as claimed in claim 15, wherein the updating an average packet count comprises:

summing the application of a first fractional value to the average packet count and the application of a second fractional value to the packet count.

17. A method of managing congestion comprising:

classifying a received packet according to a particular flow;

updating a counter corresponding to the particular flow based on the classified packet;

updating a value of an average counter based on the received packet;

marking the received packet if the packet is not marked and an average queue size exceeds a queue threshold and a packet count ratio exceeds a load-factor threshold, wherein the packet count ratio is based upon a packet count corresponding to the particular flow and the value of the average counter; and dropping the received packet if the packet is marked and the average queue size exceeds the queue threshold and the packet count ratio exceeds the load-factor threshold.

18. The method as claimed in claim 17, wherein classifying comprises:

generating a set of indices by filtering the received packet;

generating an index based on hashing the generated set of indices; and classifying the received packet according to the generated index.

19. The method as claimed in claim 17, wherein marking comprises:

transmitting the received packet.

* * * * *